Figure 1:
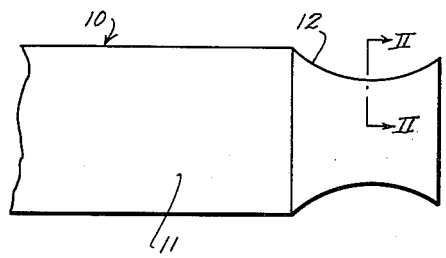

March 3, 1964  E. TERNER  3,122,883
HEAT RESISTANT WALL STRUCTURE FOR ROCKET
MOTOR NOZZLES AND THE LIKE
Filed Nov. 20, 1959

Inventor
Edward Terner
by Hill, Sherman, Meroni, Gross & Simpson Attys.

United States Patent Office 3,122,883
Patented Mar. 3, 1964

3,122,883
HEAT RESISTANT WALL STRUCTURE FOR ROCKET MOTOR NOZZLES AND THE LIKE
Edward Terner, Euclid, Ohio, assignor to Thompson Ramo Wooldridge Inc., Cleveland, Ohio, a corporation of Ohio
Filed Nov. 20, 1959, Ser. No. 854,425
3 Claims. (Cl. 60—35.6)

The present invention is directed to improved heat resistant wall structures for withstanding the effect of high temperature gas streams such as occur in rockets, turbines, and the like. The structure of the present invention is particularly applicable to the manufacture of rocket motor nozzles, and, accordingly, the succeeding description is concerned primarily with this type of structure.

At the present time, the development of solid propellant rocket motors is directed toward the attainment of higher thrusts. This is accomplished by increasing the temperature and the velocity of the gases expanding through the rocket nozzle. With conventional rocket fuels of the present time, the temperature at the nozzle is usually on the order of 5,000 to 6,500° F., and the velocity of the gas stream may range from about 6,000 to 9,000 feet per second. The pressure exhibited at the nozzle may range from 250 to 750 p.s.i. It is contemplated that in the near future, with newly proposed fuels, the temperature at the nozzle may range from 7,000 to 10,000° F., and the velocity of the gas stream from 10,000 to 12,000 feet per second. It is contemplated that the pressure at the nozzle will be on the order of 750 to 1,500 p.s.i.

Even at gas temperatures of 5,000° F., the selection of suitable materials for the rocket nozzle poses a difficult problem. Since the duration of firing is rather short, not exceeding approximately one minute, it is possible to reduce the temperature of the nozzle wall to tolerable limits by using proper insulation. It is possible to design laminations which provide the required temperature drop from the gas stream to the outer nozzle wall so as not to exceed the temperature at which the structural material of the outer wall loses the required strength.

While present designs are based on cooling by conduction through solid layers, taking into account at most mechanical erosion of the wall facing the gas stream, additional benefit is derived from the fact that ablation occurs. This ablation consists of the chemical decomposition or change of phase of the wall material, and since these processes consume heat, a heat sink is provided which reduces the temperature within the nozzle walls to still lower levels than those calculated on the basis of conduction alone. However, even with this added effect, the need still remains for a suitable heat resistant wall structure capable of withstanding the effects of gas streams at temperatures well above 5,000° F. The satisfaction of that need is one of the principal objects of the present invention.

Another object of the invention is to provide an improved heat resistant wall structure which employs secondary cooling effects to reduce local temperatures.

A further object of the invention is to provide a rocket motor nozzle structure including an insulating material which will vaporize under the conditions of operation to form a film at the inner wall of the nozzle at the boundary layer between the wall and the gas stream with which it is in contact.

In the wall structure of the present invention the nozzle wall is cooled by the inclusion of one or more layers of a material between the inner and outer walls of the nozzle which, under the conditions of operation, is transformed from the solid to the liquid and finally the vapor phase. In this type of structure, the nozzle contour is preserved while a secondary cooling effect, transpiration cooling, is obtained as the liquid or vapor formed is allowed to escape through the inner nozzle wall into the gas stream and is mixed with the boundary layer at the wall, thereby reducing the local temperatures.

A further description of the present invention will be made in conjunction with the attached sheet of drawings which illustrates a preferred embodiment thereof.

In the drawings:
FIGURE 1 is a fragmentary view in elevation of a rocket motor nozzle assembly; and
FIGURE 2 is an enlarged fragmentary cross-sectional view taken substantially along the lines II—II of FIGURE 1.

As shown in the drawings:
In FIGURE 1, reference numeral 10 indicates generally a portion of a solid propellant rocket motor including a combustion chamber 11 and a nozzle assembly 12.

Figure 2:
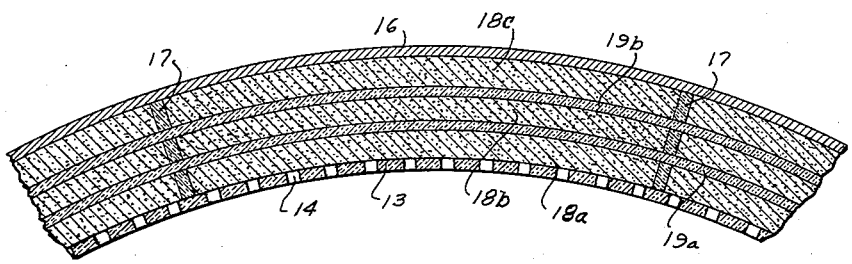

The improved wall construction employed in the nozzle 12 is best illustrated in the cross-sectional view of FIGURE 2. The inner wall, exposed to the hot gas stream, is formed of a perforate refractory matrix which, in the illustrated instance, takes the form of a gridwork 13 having openings 14 formed therein. The inner wall is formed of a ceramic material or a metallo-ceramic material, particularly carbides, nitrides or borides of metals such as tantalum, hafnium, titanium, or tungsten and the gridwork 13 may be formed by suitable powder metallurgy techniques. In some instances, it may be more desirable to employ a slotted wall instead of the gridwork 13 but in any event some means should be provided for venting vapors from the interior of the wall structure and into the boundary layer between the inner surface of the inner wall and the gas stream with which it comes into contact.

An outer stress carrying wall 16 composed of steel or the like is disposed in spaced relation to the inner wall composed of the gridwork 13 by means of ceramic spacers 17.

Between the outer wall 16 and the gridwork 13, in the form illustrated, there are a plurality of laminations 18a, 18b, and 18c of a material which is capable of undergoing a change in phase at the operating temperature of the rocket. The material of the laminations 18a, 18b and 18c is selected for its high latent heat of melting and vaporization. Preferably, the material is one which has a melting point in excess of about 5,000° F. but below the melting point of the material of which the gridwork 13 is composed. Graphite is a preferred material for the laminations 18 but other reasonable refractory materials can be used as well.

The laminations 18 are separated by relatively thin insulating layers 19a and 19b composed of a material having a much lower thermal conductivity and a somewhat higher melting temperature than the material of the laminations 18a, 18b and 18c. Such materials as silica and quartz are suitable for this purpose.

As the motor is fired, and the hot gases flow along the inner nozzle wall, the heat penetrates the wall and reaches the inner lamination 18a. The melting and possible subsequent vaporization of the lamination 18a consumes heat and slows down the progress of the heat toward the outer nozzle wall 16, keeping temperatures at tolerable levels. At the same time, any vapors formed by volatilization of the lamination 18a can escape through the openings 14 in the gridwork 13 to form a thin cooling gas shield along this wall by mixing with the gas stream and reducing the local temperatures at the wall.

The vaporizatioin of the laminations proceeds in stages, permitting vapor pressures to be built up within each lamination before vaporization starts within the next layer. The layers 19a and 19b are themselves capable of vaporization during the sequential vaporization of the laminations 18 proceeding from the inner wall toward the outer wall 16. Since the material of the layers 19a and 19b has a much lower thermal conductivity than the laminations 18a, 18b and 18c, most of the material of the innermost lamination 18a will be vaporized before the innermost layer 19a will have reached its vaporization temperature. The continual absorption of heat by the latent heats of fusion and vaporization of the materials of the laminations 18a, 18b and 18c and the materials of the layer 19a and 19b, together with the cooling effect provided by the film formed at the hot inner surface of the gridwork 13 effectively protects the outer wall 16 against heat damage for very extended periods of time.

While the inner wall of the rocket motor nozzle shown in the drawings takes form of a gridwork 13, a comparable effect can be produced by providing the material of the laminations 18a, 18b and 18c in the form of a filler occupying the openings 14 of the inner wall structure. The cooling effect in this case is provided by melting and vaporization or sweating of the filler material out of the pores. However, it is preferable to keep the vaporizable materials distinct from the matrix to accommodate larger quantities of the vaporizable material without increasing the bulkiness of the wall structure.

It will be evident that various modifications can be made to the described embodiments without departing from the scope of the present invention.

I claim as my invention:

1. A heat resistant wall structure for withstanding the effects of high temperature gas streams which comprises an outer stress resistant imperforate wall, an inner wall in spaced relation to said outer wall, said inner wall comprising a perforate refractory matrix, an insulating layer intermediate said inner wall and said outer wall, and a layer of solid heat vaporizable material disposed on each side of said insulating layer, said heat vaporizable material being capable of a phase change at a temperature less than the melting temperature of said inner wall so that said heat vaporizable material may flow along said inner wall, and said insulating layer having a thermal conductivity substantially lower than that of the heat vaporizable material.

2. A heat resistant wall structure for withstanding the effect of high temperature gas streams which comprises an outer stress resistant imperforate wall, an inner wall of porous refractory material in spaced relation to said outer wall, an insulating layer intermediate said inner wall and said outer wall, and a layer of a solid heat vaporizable material disposed on each side of said insulating layer, said heat vaporizable material having a melting temperature in excess of 5000° F. and being capable of undergoing a phase change to liquid form at a temperature less than the melting temperature of said inner wall so that said heat vaporizable material may flow along said inner wall, said insulating layer having a thermal conductivity substantially lower than that of the heat vaporizable material.

3. A rocket motor nozzle comprising an outer stress resistant imperforate wall, an inner wall in spaced relation to said outer wall, said inner wall comprising a perforate refractory matrix, an insulating layer intermediate said inner wall and said outer wall, and a layer of a solid vaporizable material disposed on each side of said insulating layer, said heat vaporizable material being capable of a phase change at a temperature less than the melting temperature of said inner wall so that said heat vaporizable material may flow along said inner wall, said insulating layer having a thermal conductivity substantially lower than that of the vaporizable material.

References Cited in the file of this patent

UNITED STATES PATENTS

| | | |
|---|---|---|
| 1,187,779 | Patton | June 20, 1916 |
| 2,183,313 | Goddard | Dec. 12, 1939 |
| 2,354,151 | Skonglund | July 18, 1944 |
| 2,405,785 | Goddard | Aug. 13, 1946 |
| 2,407,164 | Kimball | Sept. 3, 1949 |
| 2,468,820 | Goddard | May 3, 1949 |
| 2,574,190 | New | Nov. 6, 1951 |
| 2,658,332 | Nicholson | Nov. 10, 1953 |
| 2,705,399 | Allen | Apr. 5, 1955 |
| 2,908,455 | Hoadley | Oct. 13, 1959 |
| 2,922,291 | Fox et al. | Jan. 26, 1960 |
| 2,941,759 | Rice et al. | June 21, 1960 |
| 2,943,828 | Van Driest | July 5, 1960 |
| 2,962,221 | Kunz | Nov. 29, 1960 |
| 3,014,353 | Schulley et al. | Dec. 26, 1961 |
| 3,022,190 | Feldman | Feb. 20, 1962 |
| 3,026,806 | Runton et al. | Mar. 27, 1962 |
| 3,048,972 | Barlow | Aug. 14, 1962 |

FOREIGN PATENTS

| | | |
|---|---|---|
| 1,003,758 | France | Nov. 21, 1951 |
| 1,108,090 | France | Oct. 17, 1955 |